M SEWARD.
Collar for Ornamenting Carriages.

No. { 3,326. / 31.330. }  Patented Feb 5, 1861.

Witnesses.
Lucius G Peck
E J Ives

Inventor
Moses Seward

UNITED STATES PATENT OFFICE.

MOSES SEWARD, OF NEW HAVEN, CONNECTICUT.

COLLAR FOR ORNAMENTAL CARRIAGE-WORK.

Specification of Letters Patent No. 31,330, dated February 5, 1861.

*To all whom it may concern:*

Be it known that I, MOSES SEWARD, of the town and county of New Haven and State of Connecticut, have invented a new and Improved Collar for Carriages and other Like Articles, the Same being an Article of Manufacture; and I do hereby declare that the following is a full, clear, and exact description of the same, reference being had to the accompanying drawings and the letters of reference thereon, in which—

Figure 2:
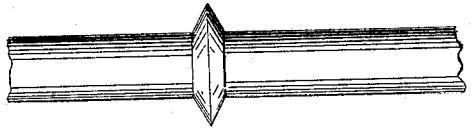
Figure 1:

Figure 1 represents my improved collar complete for market. Fig. 2 represents the same as it leaves the upsetting dies ready for the shaping and planishing dies which leave the article as in Fig. 1.

Collars for carriage work or "turned collars" as they are usually called have heretofore been made by welding a ring of iron around a rod and afterward turning them in a lathe to the required shape. By this process many were lost by defective welding and they lacked the smooth surface formed by the planishing dies.

The improved collar is formed by upsetting a solid rod of iron so as to raise the collar from the rod itself, without welding, and after the collar is so raised forming and planishing it any required shape. The advantages of the solid collar are cheapness with greater nicety of finish and entire freedom from flaws or cracks.

What I claim as my invention and desire to secure by Letters Patent as an article of manufacture is—

An upset planished collar for ornamental carriage work formed without welding or turning.

MOSES SEWARD.

In presence of—
LUCIUS G. PECK,
E. S. IVES.